United States Patent
Tan

(10) Patent No.: US 8,422,245 B2
(45) Date of Patent: Apr. 16, 2013

(54) MOTHERBOARD

(75) Inventor: Zeu-Chia Tan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 278 days.

(21) Appl. No.: 12/916,613

(22) Filed: Oct. 31, 2010

(65) Prior Publication Data

US 2012/0069510 A1    Mar. 22, 2012

(30) Foreign Application Priority Data

Sep. 17, 2010  (TW) .................................. 99131537

(51) Int. Cl.
*G06F 1/16* (2006.01)

(52) U.S. Cl.
USPC ........... 361/785; 361/736; 361/748; 361/460; 361/784

(58) Field of Classification Search .................... 361/785
See application file for complete search history.

(56) References Cited

U.S. PATENT DOCUMENTS

| 3,794,954 | A | * | 2/1974 | Reimer ........................... 439/62 |
| 5,251,098 | A | * | 10/1993 | Schmidt ......................... 361/717 |
| 5,359,495 | A | * | 10/1994 | Margalit et al. ............... 361/760 |
| 5,604,871 | A | * | 2/1997 | Pecone .......................... 710/301 |
| 6,035,356 | A | * | 3/2000 | Khan et al. .................... 710/301 |
| 6,595,783 | B1 | * | 7/2003 | Steinman et al. ............... 439/65 |
| 6,833,998 | B2 | * | 12/2004 | Chuang et al. ................ 361/803 |
| 6,893,268 | B1 | * | 5/2005 | Harari et al. .................... 439/43 |
| 6,950,311 | B1 | * | 9/2005 | DeCesare et al. ............. 361/727 |
| 8,116,078 | B2 | * | 2/2012 | Xu et al. ........................ 361/695 |
| 2011/0211310 | A1 | * | 9/2011 | Farling et al. ............ 361/679.31 |

* cited by examiner

*Primary Examiner* — Anthony Q Edwards
(74) *Attorney, Agent, or Firm* — Altis Law Group, Inc.

(57) ABSTRACT

A motherboard includes a main circuit board, a CPU socket, and an interface. The main circuit board includes a holding surface and a side wall connected to the holding surface. The CPU socket is positioned on the holding surface. The interface is positioned on the side wall. The interface is electrically connected to the CPU socket. The interface provides a connection between the main circuit board and a sub-circuit board.

12 Claims, 2 Drawing Sheets

MOTHERBOARD

BACKGROUND

1. Technical Field

The present disclosure relates to a motherboard.

2. Description of Related Art

A motherboard in a rack server includes two CPU sockets and two memory sockets corresponding to the CPU sockets in order to support dual CPUs. However, when only one CPU is installed in the server, the other CPU socket and the corresponding memory socket are idle. If the motherboard only includes a signal CPU and a signal memory socket, the motherboard will not be able to support dual CPUs, which may be necessary at some times.

What is needed, therefore, is a motherboard which can overcome the above-described problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
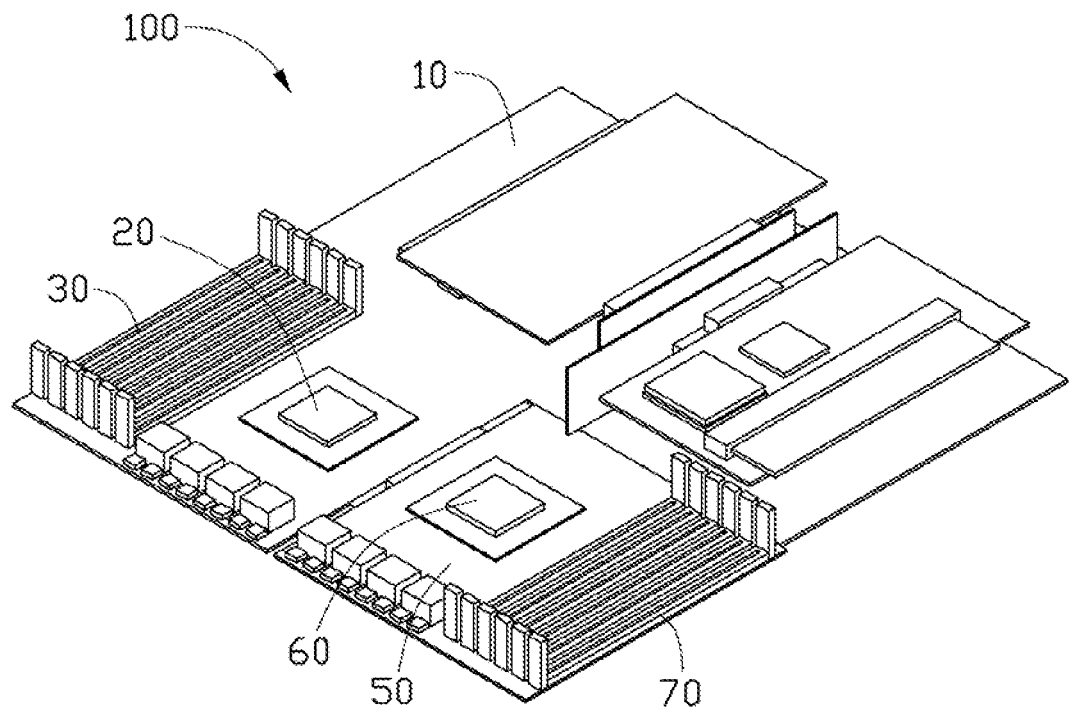
FIG. 1 is a schematic, assembled view of a motherboard according to an exemplary embodiment.
Figure 2:
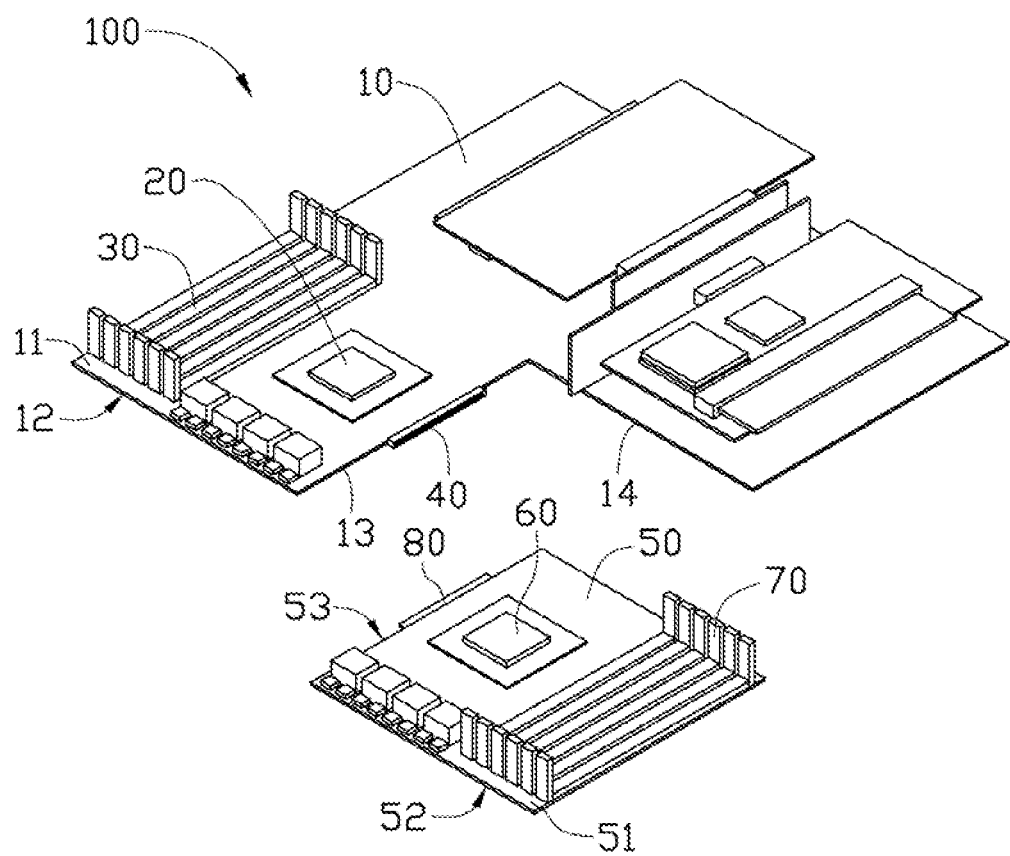
FIG. 2 is an exploded view of the motherboard of FIG. 1.

Referring to FIGS. 1-2, a motherboard 100, according to an exemplary embodiment is shown. The motherboard 100 includes a main circuit board 10, a first CPU socket 20, a first memory socket 30, a first interface 40, a sub-circuit board 50, a second CPU socket 60, a second memory socket 70, and a second interface 80.

The main circuit board 10 holds various electronic components (not labeled) and electrically connects those components to each other with conductive traces (not shown) formed therein. The main circuit board 10 includes a first holding surface 11, a first bottom surface 12 opposite to the first holding surface 11, a first side surface 13 connected between the first holding surface 11 and the first bottom surface 12. The main circuit board 10 defines an indentation 14. The indentation 14 is substantially rectangular. The first side surface 13 is the side wall of the indentation 14. The first CPU socket 20 and the first memory socket 30 are fixed on the first holding surface 11. In order to reduce the transmission distance of the signal between the first interface 40 and the first CPU socket 20, the first CPU socket 20 is positioned adjacent to the first interface 40. The first memory socket 30 is positioned at a side of the first CPU socket 20 away from the first interface 40. The first memory socket 30 is a DIMM (Dual Inline Memory Module) socket. The first memory socket 30 is connected to the first CPU socket 20 with the conductive traces formed in the main circuit board 10.

The first interface 40 is fixed on the first side surface 13, and connected to the first CPU socket 20 with the conductive traces formed in the main circuit board 10. The first interface 40 is a socket connector. The first interface 40 provides a connection between the main circuit board 10 and the sub-circuit board 50, and provides a connection between the first CPU socket 20 and the second CPU socket 60. In the present embodiment, the first interface 40 includes a quick path interconnected between the first CPU socket 20 and the second CPU socket 60, and any other necessary communicational interfaces for providing communication between the main circuit board 10 and the sub-circuit board 50.

The sub-circuit board 50 supports a number of electronic components thereon. The electronic components are electrically connected to each other with the electrically conductive traces formed in the sub-circuit board 50. In the present embodiment, the thickness of the sub-circuit board 50 is the same as that of the main circuit board 10. The sub-circuit board 50 includes a second holding surface 51, a second bottom surface 52 opposite to the second holding surface 51, a second side surface 53 connected between the second holding surface 51 and the second bottom surface 52. The second CPU socket 60 and the second memory socket 70 are fixed on the second holding surface 51. In the present embodiment, the second memory socket 70 is positioned at a side of the second CPU socket 60 away from the second interface 80. The second memory socket 70 is a DIMM (Dual Inline Memory Module) socket too. The second memory socket 70 is connected to the second CPU socket 60 with the conductive traces formed in the sub-circuit board 50. The sub-circuit board 50 matches with the indentation 14. The sub-circuit board 50 is substantially rectangular.

The second interface 80 is fixed on the second side surface 53, and connected to the second CPU socket 60 and the second memory socket 70 with the conductive traces formed in the sub-circuit board 50. The second interface 80 is a plug connector. The second interface 80 is coupled to the first interface 40.

When the second interface 80 is inserted into the first interface 40, the sub-circuit board 50 is received in the indentation 14, and the first bottom surface 12 and the second bottom surface 52 are substantially coplanar with each other.

If a user only wants to use a single CPU, the main circuit board 10 is adapted, thus, a space saving and weight saving effect is achieved. If the user wants to use dual CPUs, the assembled main circuit board 10 and sub-circuit board 50 are adapted, thus, an improvement in the capability of the motherboard is achieved. As a whole, the present disclosure provides a flexible solution to satisfy the different needs of different users.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A motherboard comprising:
    a main circuit board having a first holding surface and a side surface connected to the first holding surface;
    a first CPU socket positioned on the first holding surface;
    a first memory socket positioned on the first holding surface and electrically connected to the first CPU socket; and
    a first interface positioned on the first side surface, electrically connected to the first CPU socket, and configured for providing a connection between the main circuit board and a sub-circuit board;
    wherein the sub-circuit board has a second holding surface and a second side surface formed adjacent to the second holding surface, the main circuit board defines an indentation matching with the sub-circuit board, and the sub-circuit board comprises:

a second CPU socket positioned on the second holding surface;

a second memory socket positioned on the second holding surface, and electrically connected to the second CPU socket; and a second interface positioned on the second side surface, electrically connected to the second CPU socket and the second memory socket, and coupled to the first interface to establish communication between the sub-circuit board and the main circuit board.

2. The motherboard as claimed in claim 1, wherein the first memory socket is positioned at a side of the first CPU socket away from the first interface.

3. The motherboard as claimed in claim 1, wherein the first CPU socket is positioned adjacent to the first interface.

4. The motherboard as claimed in claim 1, wherein the second memory socket is positioned at a side of the second CPU socket away from the second interface.

5. The motherboard as claimed in claim 1, wherein the second CPU socket is positioned adjacent to the second interface.

6. The motherboard as claimed in claim 1, wherein the main circuit board comprises a first bottom surface opposite to the first holding surface, the sub-circuit board further comprises a second bottom surface opposite to the second holding surface, and the first bottom surface and the second bottom surface are coplanar with each other.

7. The motherboard as claimed in claim 1, wherein the indentation of the main circuit board is substantially rectangular.

8. The motherboard as claimed in claim 1, wherein the second memory socket is a Dual Inline Memory Module socket.

9. The motherboard as claimed in claim 1, wherein the first interface comprises a quick path interconnected between the first CPU socket and the second memory socket.

10. A motherboard comprising:

a main circuit board having a first holding surface and a side surface connected to the first holding surface;

a first CPU socket positioned on the first holding surface; and a first interface positioned on the first side surface, electrically connected to the first CPU socket, and configured for providing a connection between the main circuit board and a sub-circuit board, wherein the main circuit board defines an indentation matching with the sub-circuit board.

11. The motherboard as claimed in claim 10, wherein the main circuit board comprises a first memory socket positioned on the first holding surface and electrically connected to the first CPU socket.

12. The motherboard as claimed in claim 10, wherein the sub-circuit board has a second holding surface and a second side surface formed adjacent to the second holding surface, and the sub-circuit board comprises:

a second CPU socket positioned on the second holding surface;

a second memory socket positioned on the second holding surface, and electrically connected to the second CPU socket; and a second interface positioned on the second side surface, electrically connected to the second CPU socket and the second memory socket, and coupled to the first interface to establish communication between the sub-circuit board and the main circuit board.

* * * * *